United States Patent [19]

Bier

[11] Patent Number: 4,516,034

[45] Date of Patent: May 7, 1985

[54] CIRCUIT FOR OPERATING A DISPLACEABLE COMPONENT IN A MOTOR VEHICLE, IN PARTICULAR A MOTOR VEHICLE WINDOW

[75] Inventor: Axel Bier, Bad Rappenau, Fed. Rep. of Germany

[73] Assignee: Audi NSU Auto Union A.G., Fed. Rep. of Germany

[21] Appl. No.: 555,877

[22] PCT Filed: Mar. 24, 1983

[86] PCT No.: PCT/DE83/00054

§ 371 Date: Nov. 7, 1983

§ 102(e) Date: Nov. 7, 1983

[87] PCT Pub. No.: WO83/03440

PCT Pub. Date: Oct. 13, 1983

[30] Foreign Application Priority Data

Apr. 2, 1982 [DE] Fed. Rep. of Germany ....... 3212324

[51] Int. Cl.[3] .............................................. H02G 3/00

[52] U.S. Cl. ................................. 307/10 R; 361/170; 180/271

[58] Field of Search ................ 307/10 R, 10 AT, 113, 307/115; 361/139, 160, 170, 187, 189, 192; 340/52 F, 63, 64, 649; 180/271

[56] References Cited

U.S. PATENT DOCUMENTS

| | | | |
|---|---|---|---|
| 3,997,869 | 12/1976 | Mayer | 307/10 R X |
| 4,373,149 | 2/1983 | Coste | 307/10 R X |
| 4,375,610 | 3/1980 | Nagaoka et al. | 307/10 R X |

*Primary Examiner*—A. D. Pellinen
*Assistant Examiner*—Todd E. DeBoer
*Attorney, Agent, or Firm*—Kane, Dalsimer, Kane, Sullivan and Kurucz

[57] ABSTRACT

An electrical circuit is presented for operating a motor vehicle window, wherein the drive motor (M1 and M2) can be switched on by means of an operating switch (S1 and S2), even after the turning off the ignition (opening the ignition switch ZS) and after opening a vehicle door (closing of the door contact switch TK) or alternatively by opening a vehicle door or by the opening and reclosing of a motor vehicle door. The circuit is so designed that only a small operating current flows therethrough when the ignition is turned on as well as when the door is open, as long as the operating switch is not actuated, thus preventing a discharging of the battery even if the motor vehicle door is left open for a longer period of time.

4 Claims, 2 Drawing Figures

CIRCUIT FOR OPERATING A DISPLACEABLE COMPONENT IN A MOTOR VEHICLE, IN PARTICULAR A MOTOR VEHICLE WINDOW

BACKGROUND OF THE INVENTION

The invention relates to a circuit for operating a displaceable component in a motor vehicle, in particular a motor vehicle window with at least one motor which is connected to a voltage source by means of an operating switch in conjunction with a relay contact.

In the known circuits of this type, i.e. for the electrical actuation of a motor vehicle window, the relay coil is disposed in a circuit which is closed when the ignition switch is turned on. Thereafter, the window can be opened or closed by actuating the operating switch, while during the time the ignition is turned off the window cannot be operated. This is advantageous in that the windows cannot be opened by children who are not supervised by the driver, but it is disadvantageous in that the driver can actuate the window only after the ignition has been switched on. If one notices, after leaving the car, that one or more windows have not been closed, one must again insert the ignition key and switch on the ignition before the window can be closed. The circuit can be changed in such a manner that the windows can be actuated even when the door is open, by providing a door contact switch which closes the circuit of the relay coil when the door is open. However, the danger exists with such an arrangement that the battery discharges overnight due to the power consumption of the relay coil, if one accidentally forgets to close the door. Furthermore, the relay coil would be constantly energized as long as the ignition is switched on, which very often results in an undesirable heat generation and a high power consumption. Finally the legal regulations in many countries forbids the actuation of the windows after the ignition, has been turned off after opening the driver door or after the opening and reclosing of the driver door.

OBJECTS AND SUMMARY OF THE INVENTION

It is therefore an object of the invention to provide a circuit which, on the one hand, permits an opening or closing of a motor vehicle window or another displaceable component, for example, a sliding roof, while the vehicle door is open or, depending on the legal regulations, until the opening of the driver door or while the driver door is open until the reclosing thereof while the ignition is turned off, but which, on the other hand, requires only such a low closed-circuit power consumption that even if the door is accidentally left open the battery will not be discharged and whereby an undesired heat generation and a high energy consumption is eliminated, while the ignition switch is on.

According to the invention, the circuit of the relay coil is closed only when either the ignition had been turned on or if a door contact had been actuated and while an operating switch is simultaneously switched on. Without actuating the operating switch a closed circuit current of less than 1 mA flows and when using CMOS-components with only a few microamps so that no discernible heat development can occur, whereby the power consumption is at minimum and whereby a discharge of the battery is prevented even in a circuit with door contact closed when the driver door is opened.

DETAILED DESCRIPTION OF THE PREFERRED EMBODIMENT

Figure 1:
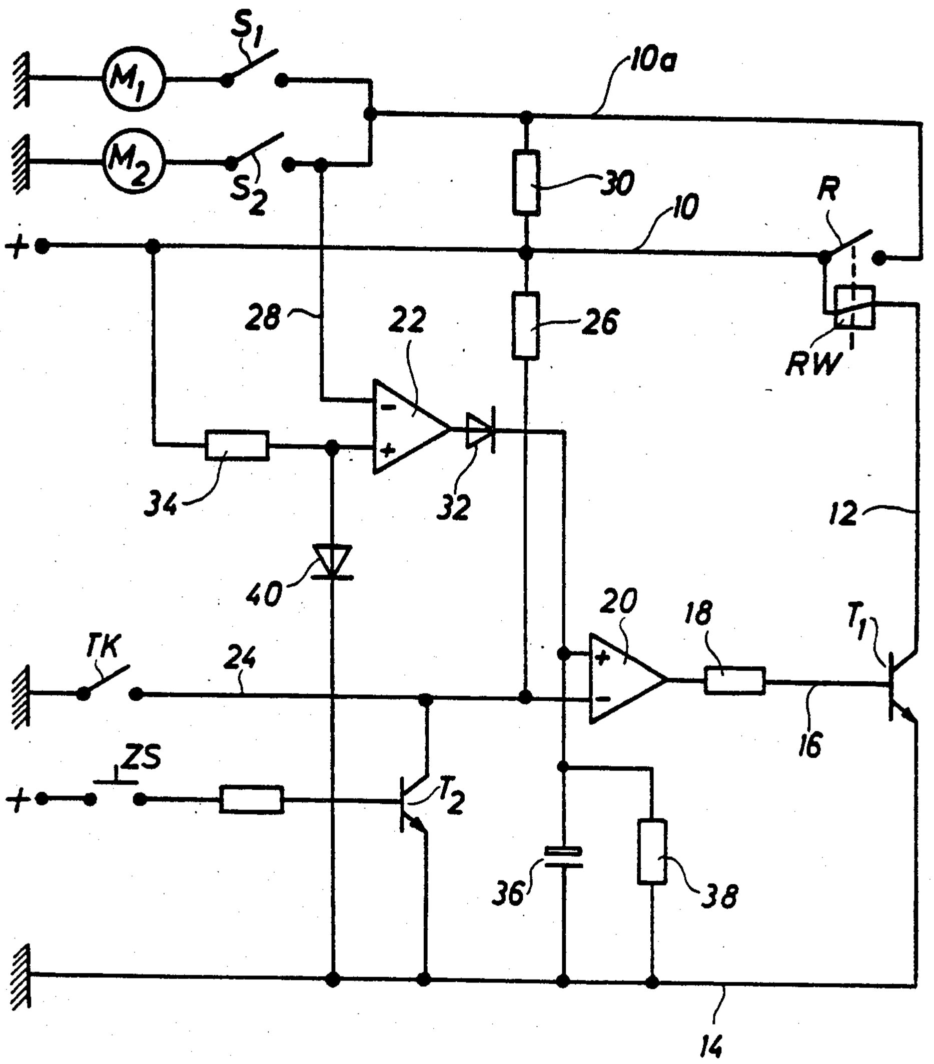
FIG. 1 shows an embodiment of the invention.

In FIG. 1, M1 and M2 designate the motors of two motor vehicle windows in FIG. 1, wherein these motors are designed to either close or open an associated window depending on the direction of their rotation when an operating switch S1 or S2 is actuated. For the sake of simplicity, the switches S1 and S2 are illustrated as simple disconnecting switches, although in practice double-throw switches are used because of the necessity of reversing the poles of the motors. The operating switches S1 and S2 are disposed in series with a relay contact R which is connected to the positive pole of the vehicle battery. When the relay contact R is closed, motor M2 may be turned on by actuating switch S1 and motor M2 is turned on by activating switch S2 so that the corresponding window can be operated.

A relay coil RW for actuating contact R is connected to the positive bus 10 and also through a line 12 to ground bus 14 when certain conditions are present, namely when door contact switch TK is closed indicating an open vehicle door or ignition switch ZS is closed and simultaneously either operating switch S1 or S2 are closed. A transistor T1 is disposed in line 12 whose base is connected through a line 16 with a resistor 18 and with the output of a first comparator 20. The noninverting input of this comparator 20 is connected through a diode 32 with the output of a second comparator 22. The inverting input of the first comparator 20 is connectable to ground by means of a line 24 and the door contact switch TK and also by means of an ignition switch ZS which controls transistor T2. When the door contact switch TK is closed the inverting input of the first comparator 20 is connected directly to ground, while during the time that the ignition switch is turned on the base of the transistor T2 is fed with voltage turning the transistor T2 on and thereby connecting the inverting input of the first comparator 20 to ground bus 14. Furthermore, the inverting input of the first comparator 20 is connected through a resistor 26 to positive bus 10. The resistor 26 acts a load resistor for transistor T2 and prevents a short when the door contact switch TK is closed.

The inverting input of the second comparator 22 is connected through a line 28 with the line 10*a* between the relay contact R and the operating switches S1 and S2. Line 10*a* is connected to the positive bus 10 through a high resistance 30 which is selected to insure that the motors M1 or M2 do not run when the operating switches S1 or S2 are closed, but the inverting input of comparator 22 is connected to the positive bus 10. The noninverting input of the second comparator 22 is connected through a resistor 34 with positive 10 and through a diode 40 with ground bus 14.

Finally, the noninverting input of the first comparator 20 is connected to ground bus 14 by means of an RC circuit consisting of the condenser 36 in parallel with the resistor 38. Diode 32 prevents the condenser 36 from discharging through the second comparator 22.

The mode of operation of the circuit illustrated by FIG. 1 is as follows:

While the door contact switch TK and/or ignition switch ZS are closed the inverting input of the first comparator 20 is pulled to ground. However, as long as one of the operating switches S1, S2 has not been actuated yet, no current flows to the base of transistor T1, so that the same stays off or deenergized, the relay coil RW is deenergized and the relay contact R remains open. As long as switch S1 or S2 is not closed, the inverting input of the second comparator is pulled up to the voltage of the positive bus 10 by means of line 28 and the resistor 30, while the potential on the noninverting input is lower (at the reference voltage source) due to the resistor 34 and the diode 40. Therefore, the noninverting input of the first comparator 20 is not supplied with voltage. When one of the operating switches S1, S2 is actuated, the inverting input of the second comparator 22 is grounded through the winding of the corresponding motor M1 or M2. Therefore, a voltage is applied to the noninverting input of the first comparator 20, so that the transistor T1 turns on and the relay coil RW is energized. The relay contact R is closed and the corresponding motor M1 or M2 is supplied with power. During this time, i.e. from closing the switch S1 or S2 until the relay responds, condenser 36 is charged up. The RC circuit 36, 38 has a time constant which corresponds to the time required for the complete opening or closing of the window, for example, 15 seconds. The RC circuit causes the first comparator 20 to stay on even after the relay contact R is closed. Without the RC circuit the first comparator 20 would not supply current to the base of the transistor T1 when the relay contact R is closed, since the second comparator 22 is deenergized or its output goes to ground as soon as contact R closes. When the corresponding switch S1 or S2 is opened, the corresponding motor becomes idle.

When both switches Tk and ZS are open, the transistor T1 is off when one of the switches S1 or S2 are actuated, since the inverting input of the first comparator 20 is at a higher potential than the noninverting input, because of resistor 26.

It can be seen that during nonactuated operating switches S1 or S2 only a small amount of operating power flows in the order of less than 1 mA, even if one of the switches TK or ZS are closed.

Figure 2:
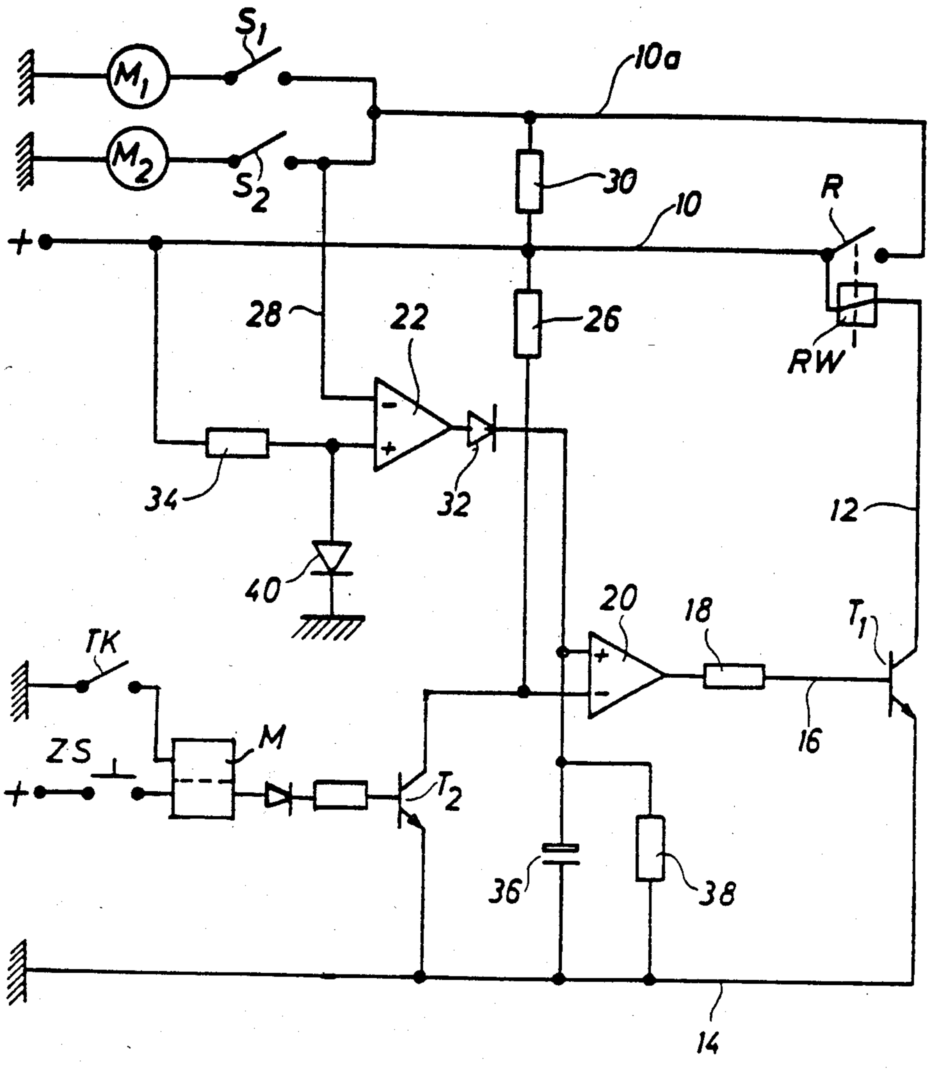
FIG. 2 shows a second embodiment of the invention.

The circuit illustrated in FIG. 2 differs from the circuit illustrated in FIG. 1 essentially in that the base of the transistor T2 is connected by means of an information storage means M in form of a Flip-Flop with an output either at the voltage source (+) or at ground. The Flip-Flop is set when the ignition switch ZS is closed and thereby the base of transistor T2 is connected to the voltage source, so that the motors M1 and M2 can be turned on by actuating the operating switches S1 and S2. When the ignition switch ZS is opened, that is, the ignition is switched off, the Flip-Flop remains set and the transistor T2 remains conductive, so that the relay coil RW remains energized in the manner described in conjunction with FIG. 1, after one of the operating switches S1 or S2 has been actuated. When the vehicle door is opened, the door contact switch TK is closed, so that the information storage M is cleared and the base of the transistor T2 is grounded. Thus, the transistor T2 is turned off and consequently the circuit of the relay coil RW is interrupted and the relay contact R is opened, so that the motors M1, M2 cannot be switched on by actuating the associated operating switch S1 or S2, as already described above. The motors can be activated only after the ignition switch ZS is closed, since the Flip-Flop is then set again. As in the circuit in accordance with FIG. 1, the operating power is very low when the ignition switch ZS is closed or when the door contact switch TK is closed, as long as none of the operating switches is actuated.

In some countries there are regulations that the motor M1 or M2 can be switched on by actuating its operating switch S1 or S2, as long as one vehicle door is opened, however that such an operation is forbidden after when the corresponding door is reclosed. For this case, the information storage means M is so designed that it remains set after setting by closing the ignition switch ZS or after opening the ignition switch ZS and after opening the door, that is, closing of the door contact switch TK and is cleared only after the reclosing of the door by opening the door contact switch TK, so that the transistor T2 turns off thus preventing a closing of the circuit of the relay coil RW by the transistor T1, even if actuating an operating switch S1 or S2 is activated. Once the coil is de-energized it may be re-energized only by closing the ignition switch ZS.

What is claimed is:

1. A circuit for operating a displaceable component in a motor vehicle, by means of an electric motor which is connected to a voltage source by means of an operating switch in series with a contact of a relay with a coil the relay coil being actuated from the ignition switch and a door contact switch (TK) characterized in that a transistor (T1) is provided in the circuit of the relay coil (RW) whose base is connected with the output of a first comparator (20), the noninverting input of the first comparator (20) being connected with the output of a second comparator (22) and the inverting input of the first comparator is selectively grounded by closing the ignition switch (ZS) or by actuating the door contact switch (TK) or by an information storage (M) which is set by closing the ignition switch (ZS) and is cleared by actuating the door contact switch (TK), the inverting input of the second comparator (22) is connected to ground when the operating switch (S1 and/or S2) is closed and when the operating switch is open said inverting input of the second comparator being connected to the voltage source by means of a resistor (30); and a noninverting input of said second comparator (22) being connected with a reference voltage source, and an RC circuit (36, 38) is provided which influences the base of the transistor (T1) in a time delaying manner.

2. The circuit in accordance with claim 1, characterized in that said RC-circuit (36, 38) is connected to the non-inverting input of said first comparator (20).

3. The circuit in accordance with claim 1, characterized in that the inverting input of said first comparator (20) is connectable to ground by means of a transistor (T2) whose base is connected to a voltage source by said ignition switch (ZS).

4. The circuit in accordance with claim 1, characterized in that said information storage (M) is a flip-flop with a set output and a clear output and that the inverting input of said first comparator (20) is connectable to ground by means of a transistor (T2) whose base is connected to a voltage source through the set output and to ground through the clear output.

* * * * *